United States Patent
Park et al.

(10) Patent No.: US 9,939,998 B2
(45) Date of Patent: Apr. 10, 2018

(54) MOBILE TERMINAL AND CONTROLLING METHOD THEREOF

(71) Applicant: LG ELECTRONICS INC., Seoul (KR)

(72) Inventors: Hyekyung Park, Seoul (KR); Joowoo Lee, Seoul (KR); Hyehyun Kim, Seoul (KR); Sunjung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 384 days.

(21) Appl. No.: 13/956,927

(22) Filed: Aug. 1, 2013

(65) Prior Publication Data
US 2014/0040742 A1 Feb. 6, 2014

(30) Foreign Application Priority Data
Aug. 3, 2012 (KR) .................. 10-2012-0085087

(51) Int. Cl.
*G06F 3/048* (2013.01)
*G06F 3/0484* (2013.01)
*G06F 3/0488* (2013.01)
*H04M 1/725* (2006.01)

(52) U.S. Cl.
CPC ........ *G06F 3/0484* (2013.01); *G06F 3/04842* (2013.01); *G06F 3/04886* (2013.01); *H04M 1/72561* (2013.01); *G06F 2203/04803* (2013.01); *H04M 1/72583* (2013.01); *H04M 2250/22* (2013.01)

(58) Field of Classification Search
CPC .. G11B 27/34; G11B 27/034; H04N 5/44543; G06F 3/0484; G06F 3/04842; G06F 3/04886; G06F 2203/04803; H04M 1/72561; H04M 1/72583; H04M 2250/22
USPC ........................................ 715/719
See application file for complete search history.

(56) References Cited

U.S. PATENT DOCUMENTS

| | | | | |
|---|---|---|---|---|
| 8,291,452 | B1* | 10/2012 | Yong | ................. H04N 21/2743 715/719 |
| 2005/0081155 | A1* | 4/2005 | Martin | ................. G11B 27/34 715/719 |
| 2008/0220822 | A1* | 9/2008 | Park | .......................... 455/566 |

(Continued)

FOREIGN PATENT DOCUMENTS

| | | |
|---|---|---|
| CN | 101145159 A | 3/2008 |
| CN | 103024262 A | 3/2008 |

(Continued)

*Primary Examiner* — Ajay Bhatia
*Assistant Examiner* — Jian Yu
(74) *Attorney, Agent, or Firm* — Birch, Stewart, Kolasch & Birch, LLP

(57) ABSTRACT

A mobile terminal and controlling method thereof are disclosed, by which various kinds of informations and/or functions for at least one content can be provided through a plurality of partitioned regions generated by partitioning a region of a display object for the at least one content into a plurality of the partitioned regions. The present invention may include creating a display object corresponding to an upper content in a manner of having an inner space partitioned into a plurality of regions and displaying the created display object on a touchscreen, wherein different lower contents subordinate to the upper content are displayed on a plurality of the regions, respectively.

20 Claims, 15 Drawing Sheets

(56) References Cited

U.S. PATENT DOCUMENTS

| | | | |
|---|---|---|---|
| 2008/0234849 A1* | 9/2008 | Han | G11B 27/105 700/94 |
| 2009/0031255 A1* | 1/2009 | Kidd | H04N 21/4312 715/845 |
| 2009/0172543 A1* | 7/2009 | Cronin et al. | 715/721 |
| 2009/0265662 A1* | 10/2009 | Bamford | G06F 3/04886 715/800 |
| 2010/0110295 A1 | 5/2010 | Saijo | |
| 2010/0281046 A1 | 11/2010 | Lee | |
| 2011/0087992 A1* | 4/2011 | Wang et al. | 715/784 |
| 2011/0157225 A1 | 6/2011 | Cheon et al. | |
| 2011/0164175 A1* | 7/2011 | Chung et al. | 348/468 |
| 2012/0079430 A1* | 3/2012 | Kwahk | G06F 3/0488 715/834 |
| 2012/0124517 A1* | 5/2012 | Landry | G06F 17/30058 715/810 |
| 2012/0139945 A1* | 6/2012 | Choi | G06F 3/0346 345/660 |
| 2013/0070143 A1 | 3/2013 | Jang et al. | |
| 2013/0179785 A1* | 7/2013 | Kim | G06F 17/30905 715/719 |

FOREIGN PATENT DOCUMENTS

| | | |
|---|---|---|
| CN | 103051718 A | 4/2013 |
| EP | 2426665 A1 | 3/2012 |
| EP | 2455873 A2 | 5/2012 |

\* cited by examiner

FIG. 5
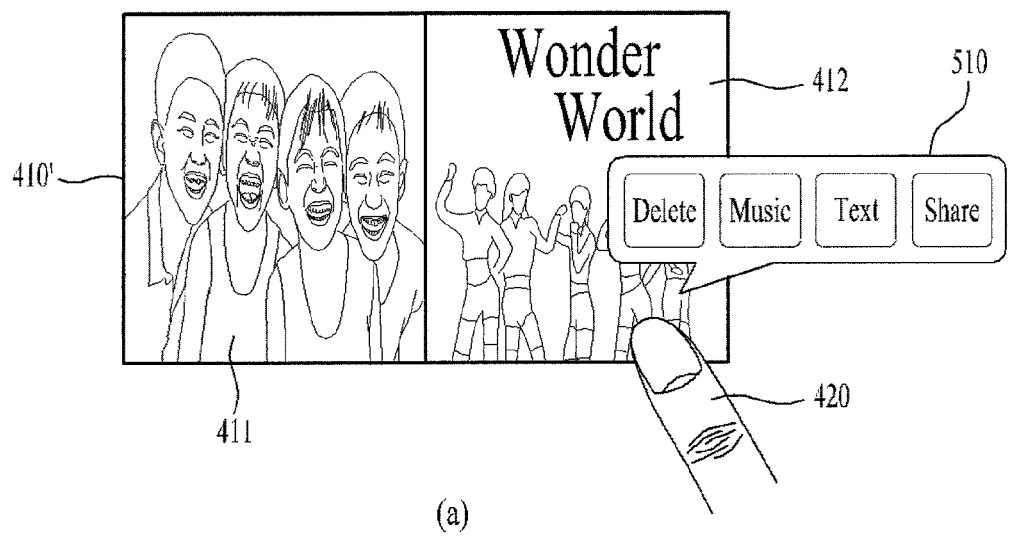
(a)
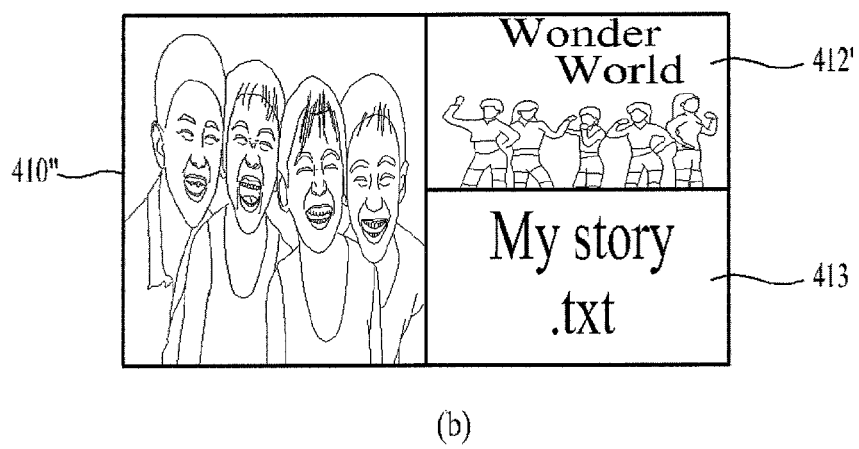
(b)

FIG. 8
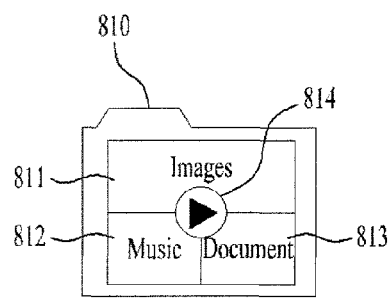
(a)
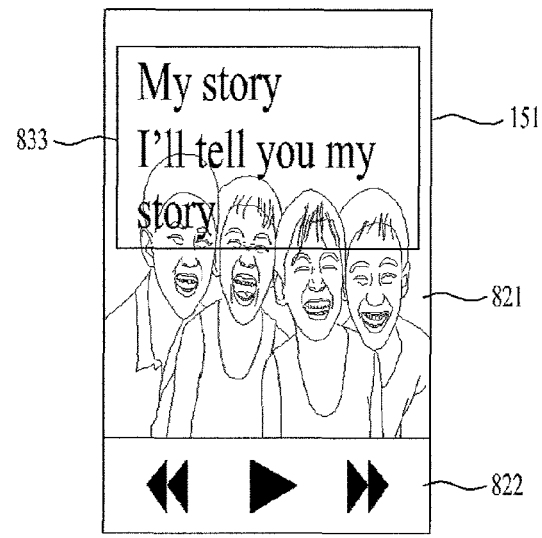
(b)
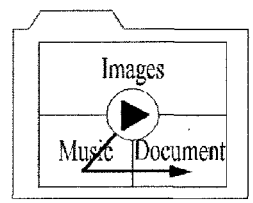
(c)
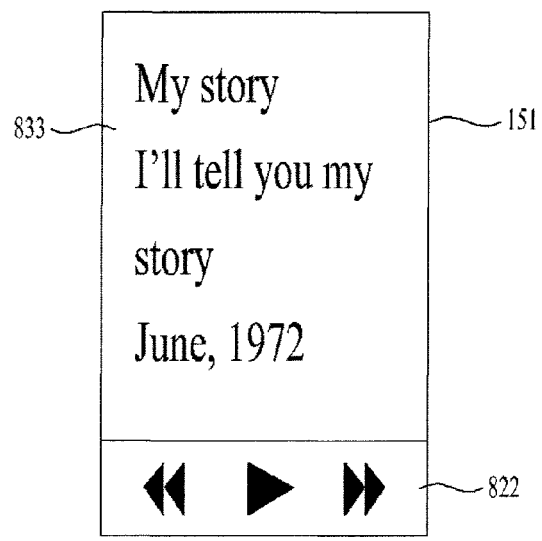
(d)

FIG. 11
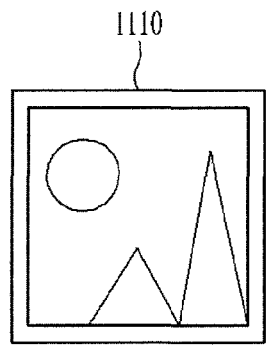
(a)
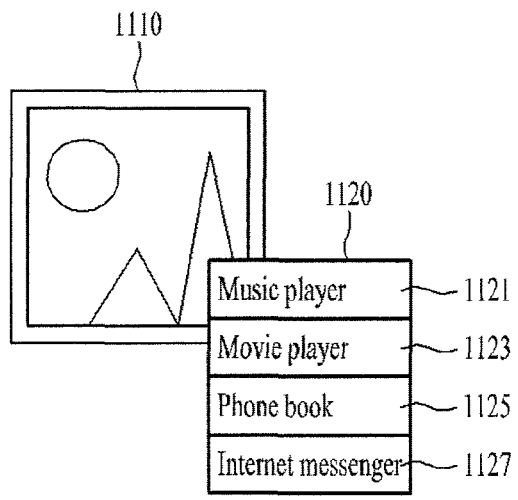
(b)
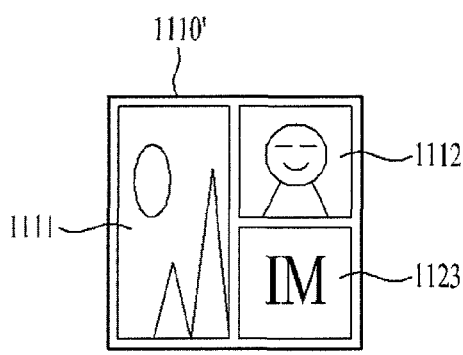
(c)
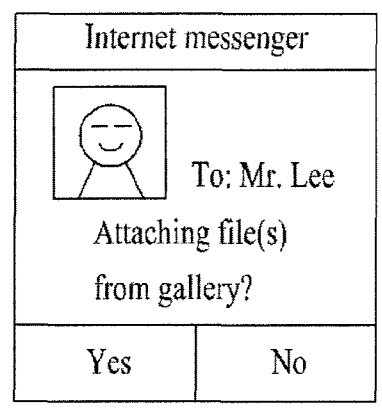
(d)

FIG. 13
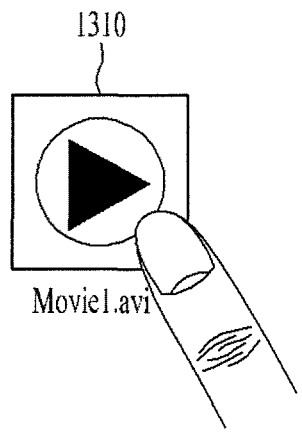
(a)
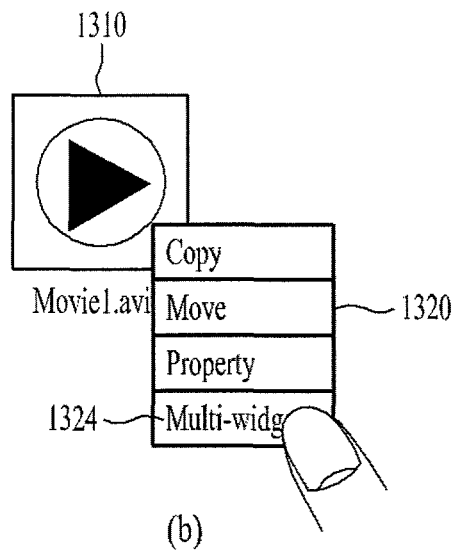
(b)
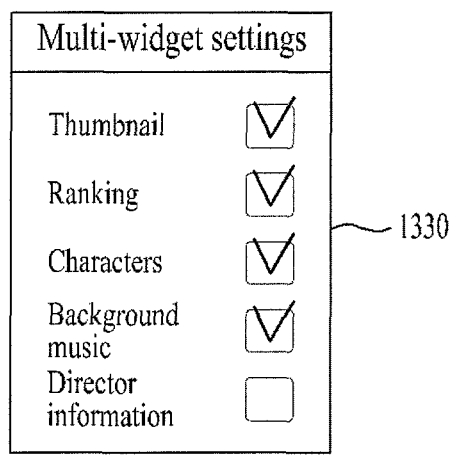
(c)

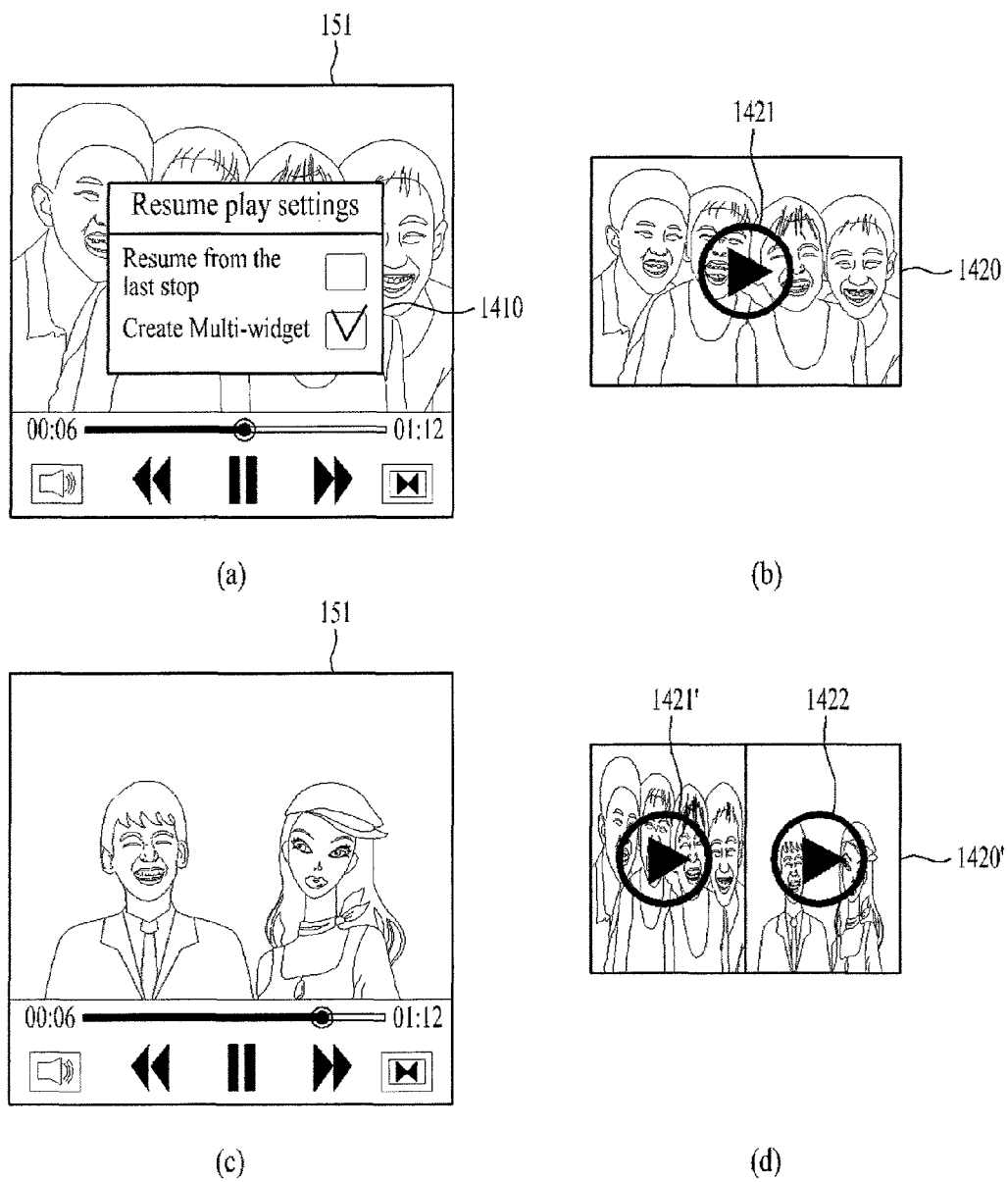

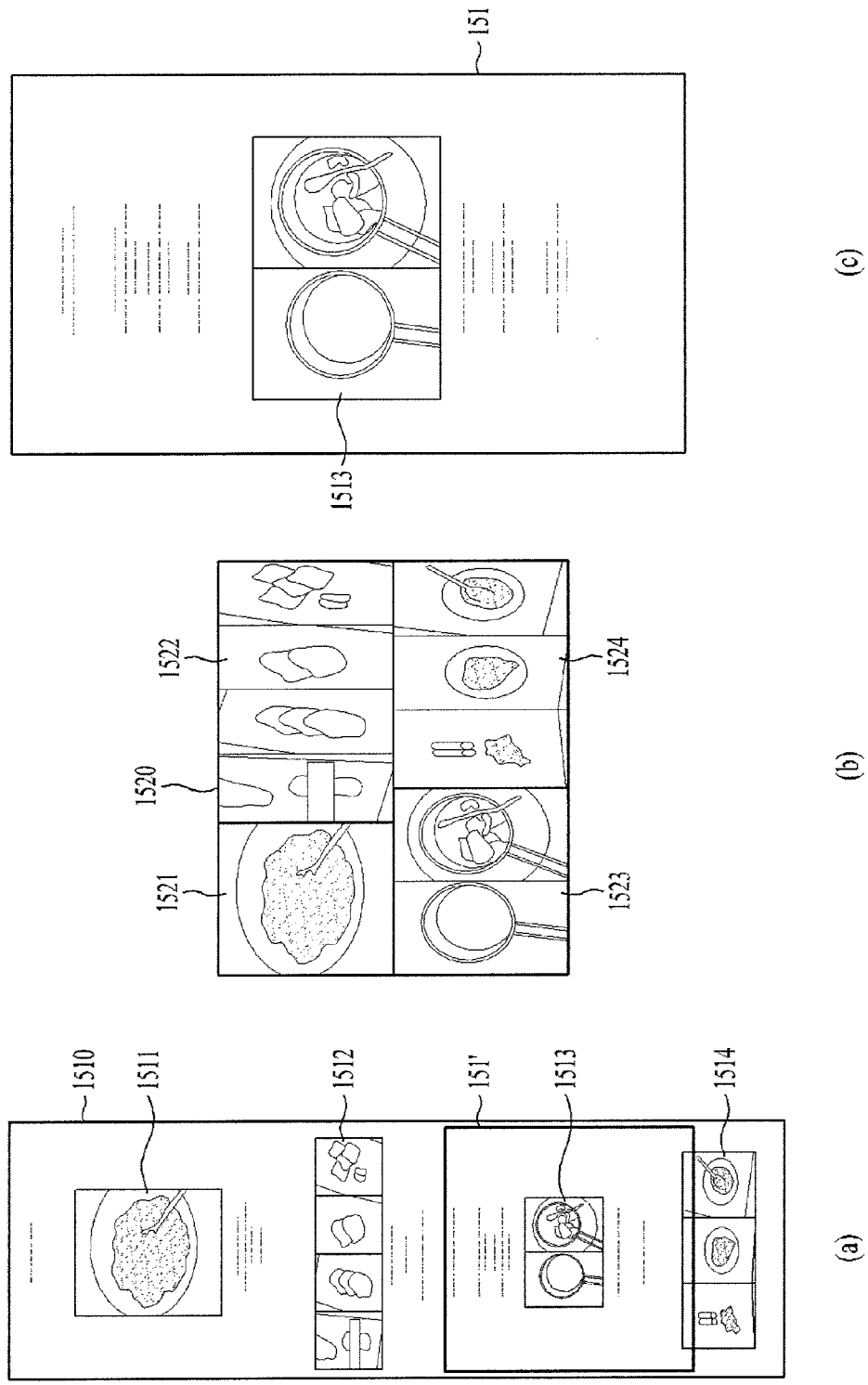

MOBILE TERMINAL AND CONTROLLING METHOD THEREOF

Pursuant to 35 U.S.C. § 119(a), this application claims the benefit of earlier filing date and right of priority to Korean Patent Application No. 10-2012-0085087, filed on Aug. 3, 2012, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for providing various kinds of informations and/or functions for at least one content through a plurality of regions generated by partitioning a region of a display object for the at least one content into a plurality of the regions.

Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, icons and/or widgets of various types are used for a smart type mobile terminal. However, each of the icons and/or widgets just provides a shortcut function or an activation function for a content, an application or the like.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a display object configured to provide various functions can be provided.

Another object of the present invention is to provide a mobile terminal and controlling method thereof, by which editing of a content is facilitated using a display object.

A further object of the present invention is to provide a mobile terminal and controlling method thereof, by which a content edited through a display object can be conveniently played or shared.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen and a controller displaying a display object, which includes a plurality of inner regions and a play menu, on the touchscreen, the controller controlling a content, which corresponds to at least one inner region included in a path of moving the play menu among a plurality of the inner regions, to be played.

In this case, if a prescribed creation condition is met, the controller creates the display object. And, the prescribed creation condition may include a user's creation command input through the touchscreen and a display object configuration information reception from an external environment.

The display object may correspond to a single folder. And, the number of a plurality of the inner regions may be determined in accordance with the category sorting of contents included in the folder.

If at least two inner regions are included in the path of moving the play menu and categories of the contents corresponding to the at least two inner regions are different from each other, the controller can control each of the contents of the different categories to be simultaneously played. On the other hand, if at least two inner regions are included in the path of moving the play menu and categories of the contents corresponding to the at least two inner regions are equal to each other, the controller can control the contents of the same category to be sequentially played.

The controller can control the contents of the same category to be played in accordance with an order that the play menu passes through the inner regions respectively corresponding to the contents of the same category.

The play menu may be arranged at the center of the display object. If the play menu button is selected, the controller can control a corresponding content to be played on all of a plurality of the inner regions.

And, the play menu may be moved along a path of a touch & drag input to the touchscreen.

In another aspect of the present invention, a method of controlling a mobile terminal includes the steps of displaying a display object including a plurality of inner regions and a play menu on a touchscreen, determining a path of moving the play menu within the display object, and playing a content corresponding to at least one inner region included in the determined path.

Accordingly, the present invention provides the following effects and/or advantages.

First of all, a user can conveniently play a content through a mobile terminal according to at least one embodiment of the present invention.

In particular, the present invention facilitates a content to be edited or shared using a display object.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5(a)-(b) is a diagram for one example of a method of editing a created multi-widget in a mobile terminal according to one embodiment of the present invention;

FIG. 8(a)-(d) and FIG. 9(a)-(c) are diagrams for methods of playing a content using a play menu button in a mobile terminal according to one embodiment of the present invention, respectively;

FIG. 11(a)-(d) is a diagram for one example of a case that a plurality of applications are combined with a multi-widget in a mobile terminal according to another aspect of one embodiment of the present invention;

FIG. 13(a)-(c) is a diagram for one example of a method of creating a multi-widget from a video file in a mobile terminal according to another embodiment of the present invention;

FIG. 14(a)-(d) is a diagram for one example of a method of creating a multi-widget through a video play application in a mobile terminal according to another embodiment of the present invention; and FIG. 15(a)-(c) is a diagram for one example of a method of creating a multi-widget corresponding to a webpage and accessing the webpage using the multi-widget according to another embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the disclosure only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
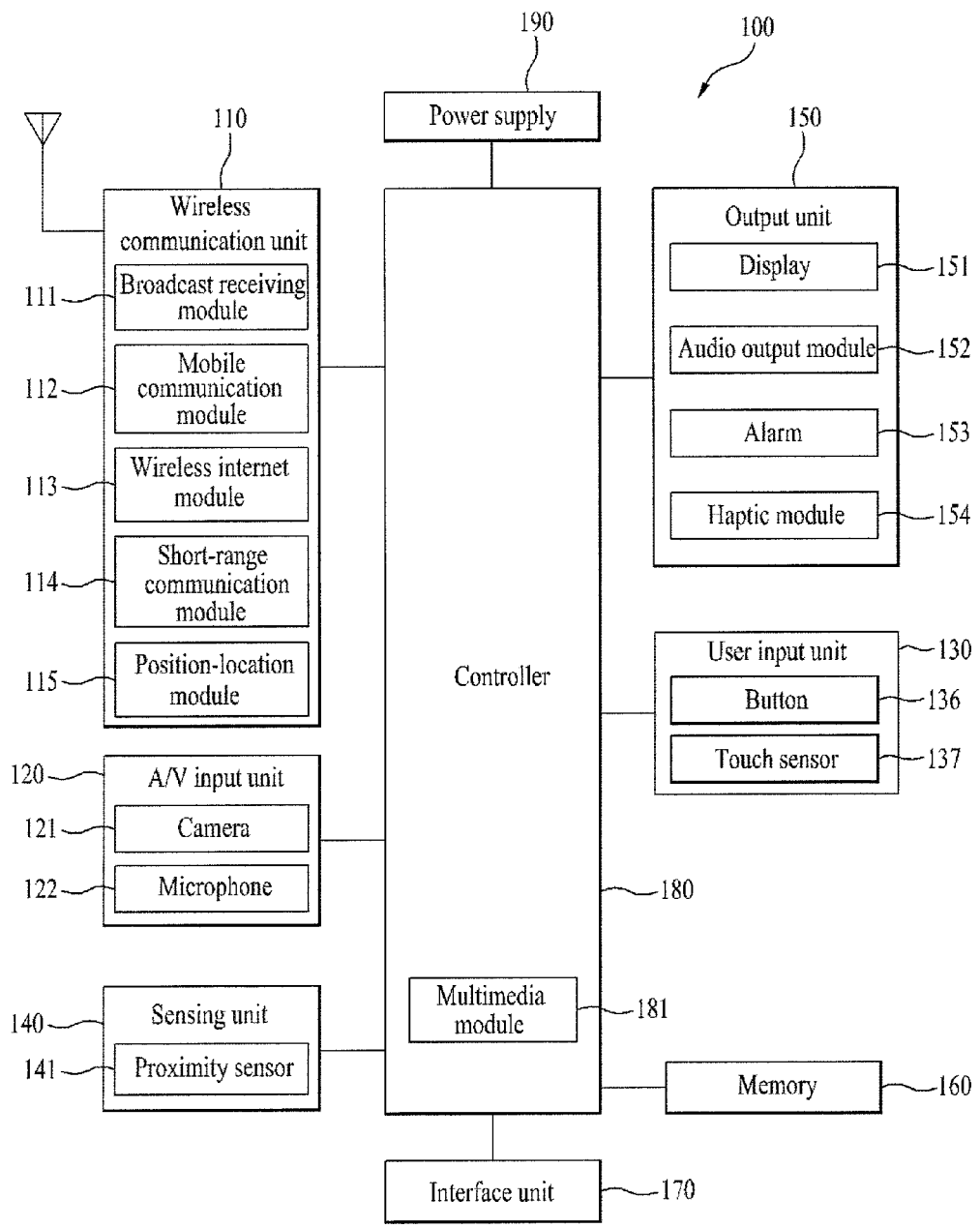
FIG. 1 is a block diagram of a mobile terminal according to one embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time informations are then amended (or corrected) using another satellite. In addition, the GPS module 115 is able to calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100. As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, and a projector module 155.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user may be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this case, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may named 'contact touch'. And, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 is able to output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output in a manner of being synthesized together or can be output in sequence.

The haptic module 154 is able to generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 is able to operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
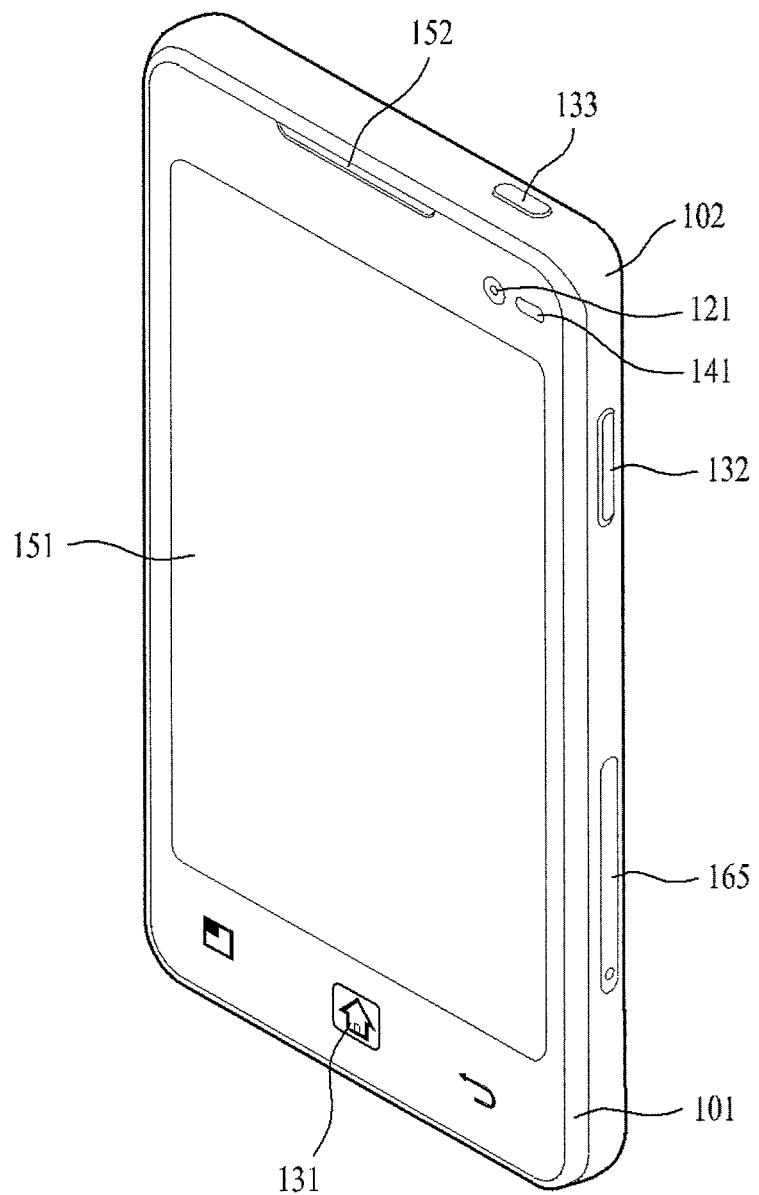
FIG. 2 is a front perspective diagram of a mobile terminal according to one embodiment of the present invention.

FIG. 2 is a front perspective view of a mobile terminal according to one embodiment of the present invention.

The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following disclosure will primarily relate to a bar-type mobile terminal 100. However, it is understood that such disclosure may apply equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130 (see FIG. 1).

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

For clarity and convenience of the following description, a mobile terminal mentioned in the following description is assumed as including at least one of the components shown in FIG. 1.

A method of creating a display object corresponding to such a unit content as an internet webpage, a single content, a folder including a plurality of contents, a shortcut collection for a plurality of files and the like and editing/playing/sharing the unit content through the corresponding object and mobile terminal for the same according to one embodiment of the present invention are proposed as follows.

In this case, the display object may mean an object that can be displayed as an icon, a widget or the like on the touchscreen 151 and manipulated through a touch input. Yet, unlike a general icon or widget, it may be unnecessary for the display object of the present invention to be limitedly displayed on a background screen, a home screen, a main menu or the like. An inner space of the display object is partitioned into a plurality of partitioned spaces if necessary. Hence, various kinds of informations can be displayed on a plurality of the partitioned spaces or menus for activating specific functions can be arranged on a plurality of the partitioned spaces. Of course, a plurality of informations and a plurality of menus can be displayed on a plurality of the partitioned spaces together.

Figure 3:
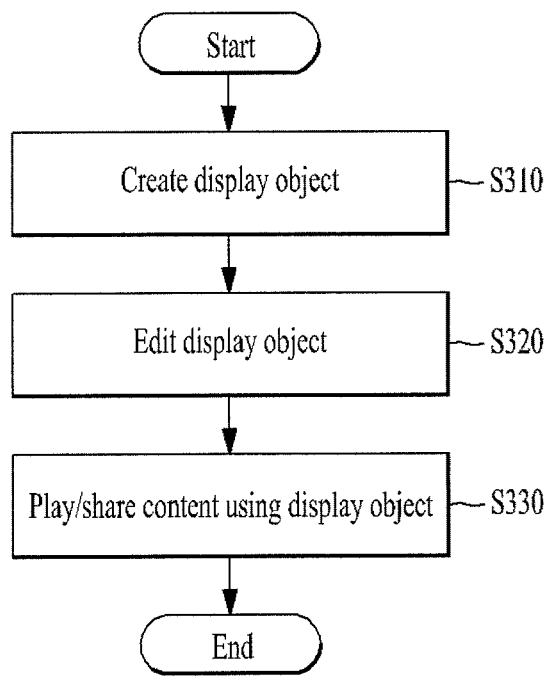
FIG. 3 is a flowchart for one example of a method of playing and editing a content using a display object for a unit content in a mobile terminal according to one embodiment of the present invention.

FIG. 3 is a flowchart for one example of a method of playing and editing a content using a display object for a unit content in a mobile terminal according to one embodiment of the present invention.

Referring to FIG. 3, if a display object creating condition for a unit content is met, the controller 180 can create a display object for a corresponding content [S310]. In particular, if a user inputs a corresponding command, a display object can be created. Alternatively, if a display object creating condition is met, a display object can be automatically created. Alternatively, if a preset condition such as an event occurrence and the like is met, a display object can be created. Moreover, a display object created location can be determined by a user's selection or may be previously determined in accordance with a display unit creating condition that was met already.

For instance, when a unit content includes a specific webpage, if a bookmark creating command is inputted, the controller 180 can create a display object for the corresponding webpage on a bookmark list or home screen. For instance, if a display object creating command for a folder displayed on a file browser, a home screen or the like is inputted, a display object corresponding folder can be created at a preset location such as a home screen and the like.

In configuring a display object, the controller 180 analyzes a subordinate content included in a unit content, partitions an inner space of a display object into a plurality of regions in accordance with a prescribed reference, and is then able to arrange images, texts and/or menus in the partitioned regions, respectively. For instance, if a unit content is a folder including a plurality of multimedia files of different types, the controller 180 can sort the multimedia files in the corresponding folder into video files and audio files. Subsequently, the controller 180 partitions an inner space of a display object into two regions and is then able to configure the display object in a manner that information corresponding to the video file and information corresponding to the audio file are displayed on the two regions, respectively.

After the display object has been created, the controller 180 may edit the information displayed on each of the partitioned regions within the display object in response to a user's command input or may edit the unit content for the corresponding display object [S320].

Thereafter, the controller 180 can play or share the unit content in accordance with the information of the edited display object [S330].

Of course, the user may skip the step S320 if necessary.

In the following description, a method of creating a display object per type of a unit content and editing/playing/sharing a unit content using the created display object is explained in detail.

Methods of creating a display object corresponding to a plurality of different contents are described with reference to FIGS. 4 to 7 as follows. In the following description, the above-mentioned display object is assumed as having a type of a widget. And, the display object of the widget type shall be named 'multi-widget'. Of course, the above assumption is made for clarity and convenience of the description only. A display object of the present invention is non-limited by a widget displayed on a home screen. In particular, a display object of the present invention may have an item configuration (e.g., a thumbnail in an image list of gallery, a thumbnail in a video list of a video players, etc.) of a contents list or a configuration for replacing a general icon.

It is able to create a multi-widget in a manner of adding another content or function to such an object as a pre-created icon, a pre-created widget and the like. This creating method is described with reference to FIG. 4 as follows.

Figure 4:
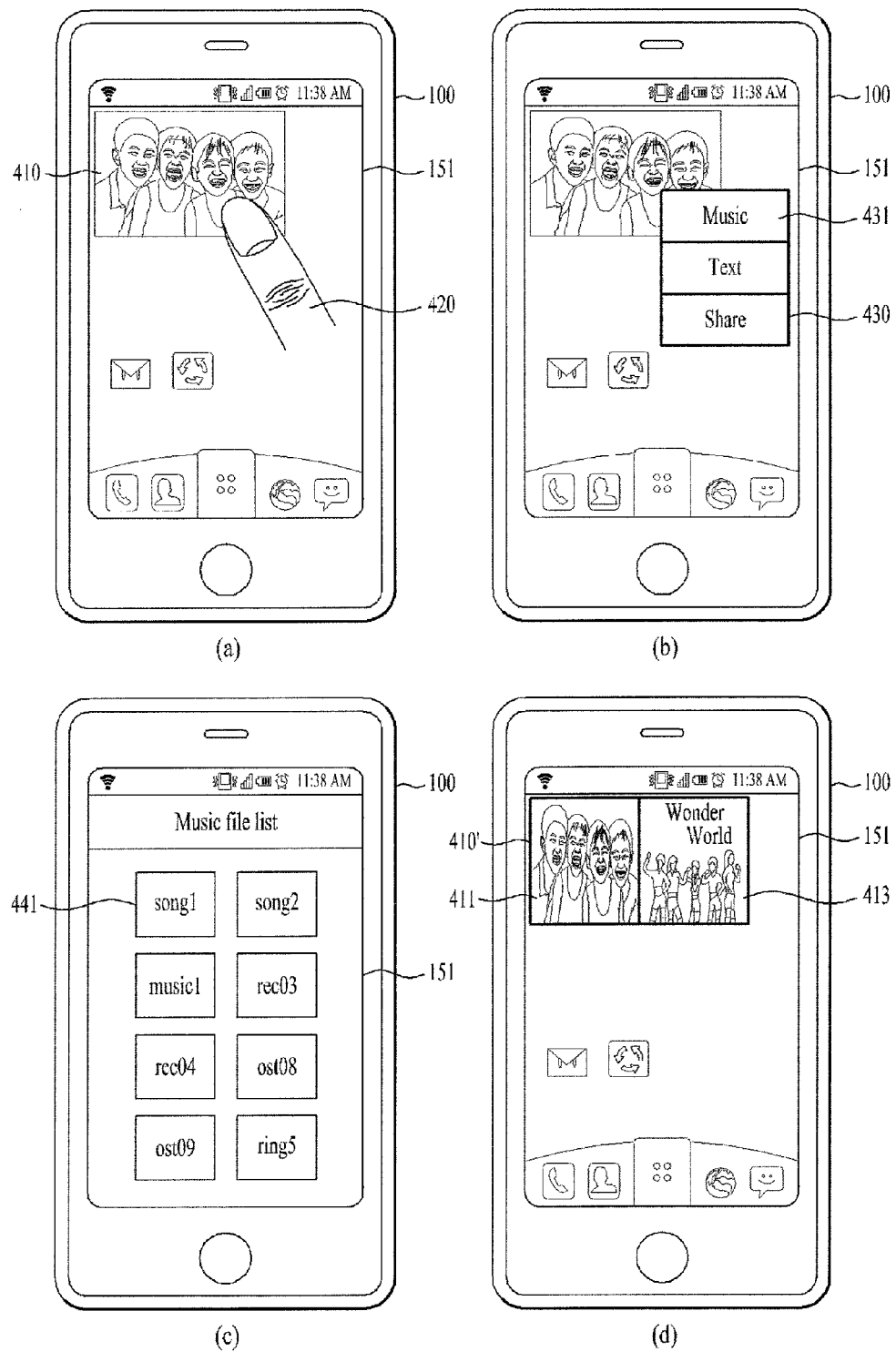
FIG. 4(a)-(d) is a diagram for one example of a method of creating a multi-widget using a previously created object in a mobile terminal according to one embodiment of the present invention.

FIG. 4 is a diagram for one example of a method of creating a multi-widget using a previously created object in a mobile terminal according to one embodiment of the present invention.

Referring to FIG. 4, an image frame widget 410 is arranged on a home screen displayed on the touchscreen 151 of the mobile terminal 100. If a user selects the image frame widget 410 by a touch input of a prescribed type (e.g., a long touch) using a pointer 420 [FIG. 4(a)], a select menu 430 for configuring a multi-widget can be displayed [FIG. 4(b)].

Subsequently, if the user selects Music 431 from the select menu 430, a list of selectable music contents can be displayed [FIG. 4(c)]. In this case, the list of the music contents may be configured with music files saved in the memory 160 of the mobile terminal 100 or audio contents (i.e., music files and streaming included) located at such a wire/wireless accessible place as an external device, a web, a cloud and the like. If the user selects an item 441 corresponding to a specific music content from the list, referring to FIG. 4(d), a format of the frame widget 410 is changed into a multi-widget 410' and an inner space of the multi-widget 410' is partitioned into two regions 411 and 413. For example, a previous image can be displayed on the left region 411 and information (e.g., an album jacket image, etc.) on the selected music content can be displayed on the right region 413.

If the album jacket image is not available, such an obtainable information on the corresponding content as a title of the selected music content, a copyright of the selected music content, a play time of the selected music content and the like can be displayed instead of the album jacket image.

Although a single music content is assumed as selected in FIG. 4, a plurality of audio contents may be selected depending on a type of the list of the music contents or an audio content can be selected by folder unit.

FIG. 5 is a diagram for one example of a method of editing a created multi-widget in a mobile terminal according to one embodiment of the present invention.

Referring to FIG. 5, in case that a user intends to add a new content by partitioning the right region 412 of the multi-widget 410' created by the method mentioned in the foregoing description with reference to FIG. 4, the user can apply a prescribed touch input (e.g., a long touch input) to the right region 412 using a pointer 420 [FIG. 5(a)]. If the prescribed touch input is applied, an edit menu 510 can be displayed. If the user selects a text menu from the edit menu 510, a user interface (not shown in the drawing) for selecting a text content can be displayed on the touchscreen. In this case, the user interface for selecting the text content may be configured as a file list similar to that shown in FIG. 4(c). Alternatively, the user interface for selecting the text content may be configured to enable a user-desired whole or partial text to be selected from a webpage or a text reader application.

If the text selection is completed, referring to FIG. 5(b), the right region of the multi-widget 410" is partitioned into a top region and a bottom region 412' and 413. For example, the former information on the music content is displayed on the top region 412' and an information on the newly added text content can be displayed on the bottom region 413.

If the user selects a delete menu of the edit menu 510 in the situation shown in FIG. 5(a), the multi-widget can return to the former frame widget shown in FIG. 4(a).

Meanwhile, a multi-widget can be created in a manner of setting a single folder as a unit content. This is described with reference to FIG. 6 as follows.

Figure 6:
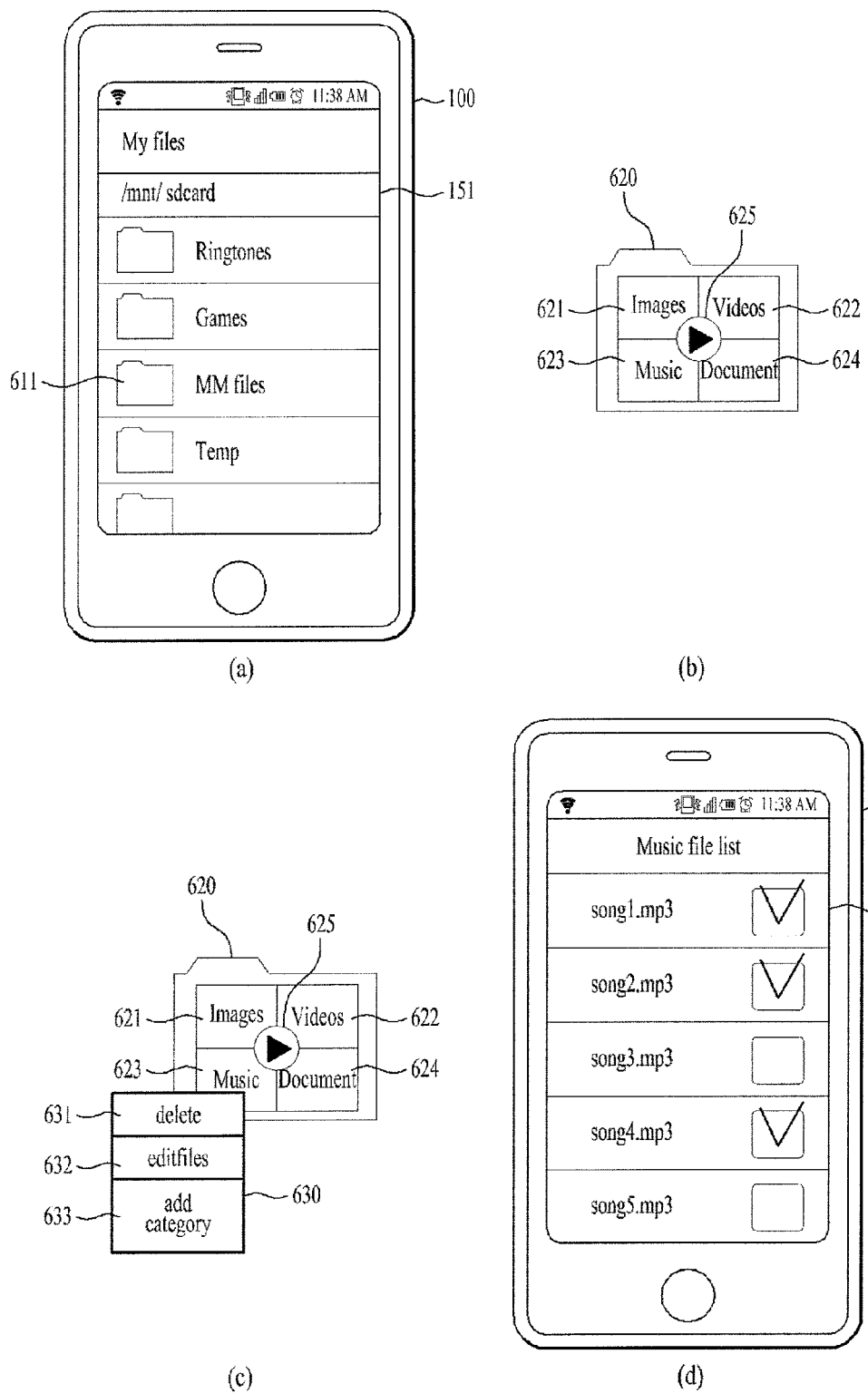
FIG. 6(a)-(d) is a diagram for one example of a method of creating and editing a multi-widget by folder unit in a mobile terminal according to one embodiment of the present invention.

FIG. 6 is a diagram for one example of a method of creating and editing a multi-widget by folder unit in a mobile terminal according to one embodiment of the present invention.

Referring to FIG. 6(a), as a file browser is activated on the touchscreen 151 of the mobile terminal 100, a list of folders saved in the memory 160 of the mobile terminal 100 is displayed. If so, a user can create a multi-widget for a specific folder 611 in a manner of selecting the specific folder 611 using a predetermined command input (e.g., a touch input of a specific pattern, a prescribed menu manipulation, a combination of the touch input and the prescribed menu manipulation, etc.).

The controller 180 analyzes categories of contents included in the selected folder in response to a user's command input, partitions an inner space of the multi-widget into a plurality of regions per category in accordance with a result of the analysis, and is then able to display informations on the categories on a plurality of the partitioned regions, respectively. For instance, if the controller 180 categorizes the contents included in the selected folder into an image, a video, a music and a document file, an inner space of a folder type rim 620 of the multi-widget for the selected folder can be partitioned into 4 regions 621 to 624 [FIG. 4(b)]. In addition, a play menu button (or a play menu icon) 625 can be provided within the multi-widget. A method of playing/sharing a content using the play menu button shall be described later with reference to FIGS. 8 to 10. As mentioned in the foregoing description, the multi-widget may be arranged on such a preset location as a home screen, a main menu and the like. Alternatively, the multi-widget may be arranged on a location directly selected by a user in the course of creating the multi-widget. For clarity and convenience of the following description, a multi-widget or a widget is displayed only in some of the drawings including FIG. 6(b). Yet, the corresponding multi-widget or the corresponding widget is still assumed as displayed on the touchscreen.

Meanwhile, if the user intends to change the category configuration of the multi-widget or edit each of the contents sorted by the categories, the user can apply a touch input or a long touch input to an editing-desired content. For instance, when the user intends to edit the music category, if the user selects a region 623 corresponding to the music category using a touch input, referring to FIG. 6(c), an edit menu 630 can be displayed. In particular, a category delete menu 631, a file edit menu 632 and a category add menu 633 can be included in the edit menu 620.

If the category delete menu 631 is selected, the region 623 corresponding to the music category disappears and an inner space of the multi-widget can be changed into 3 partitions from the previous 4 partitions. If the category add menu 633 is selected, the inner space of the multi-widget can be changed into 5 partitions from the previous 4 partitions. In this case, the controller 180 can sort the contents in the corresponding folder into 5 categories by applying a new sorting reference. Of course, the user names a new category and is then able to directly select a content to be included in the new category.

If the file edit menu 632 is selected, referring to FIG. 6(d), a list of contents belonging to the corresponding category can be displayed. In particular, it is able to release the selection of at least one of the contents sorted into the corresponding category using at least one check box.

Of course, if a region corresponding to a specific category is selected from the inner space of the multi-widget, a list of contents belonging to the corresponding category can be displayed instead of the edit menu 630 shown in FIG. 6(c). FIG. 6 shows that the text indicating the name of each of the categories is displayed on the inner space of the multi-widget for example, by which the present invention may be non-limited. For instance, any information (e.g., a thumbnail image, a content icon, a content name, a combination thereof, etc.) on a content included in a corresponding category can be displayed.

It is able to create a multi-widget by a method similar to that of creating a general icon or widget on a home screen. This is described in detail with reference to FIG. 7 as follows.

Figure 7:
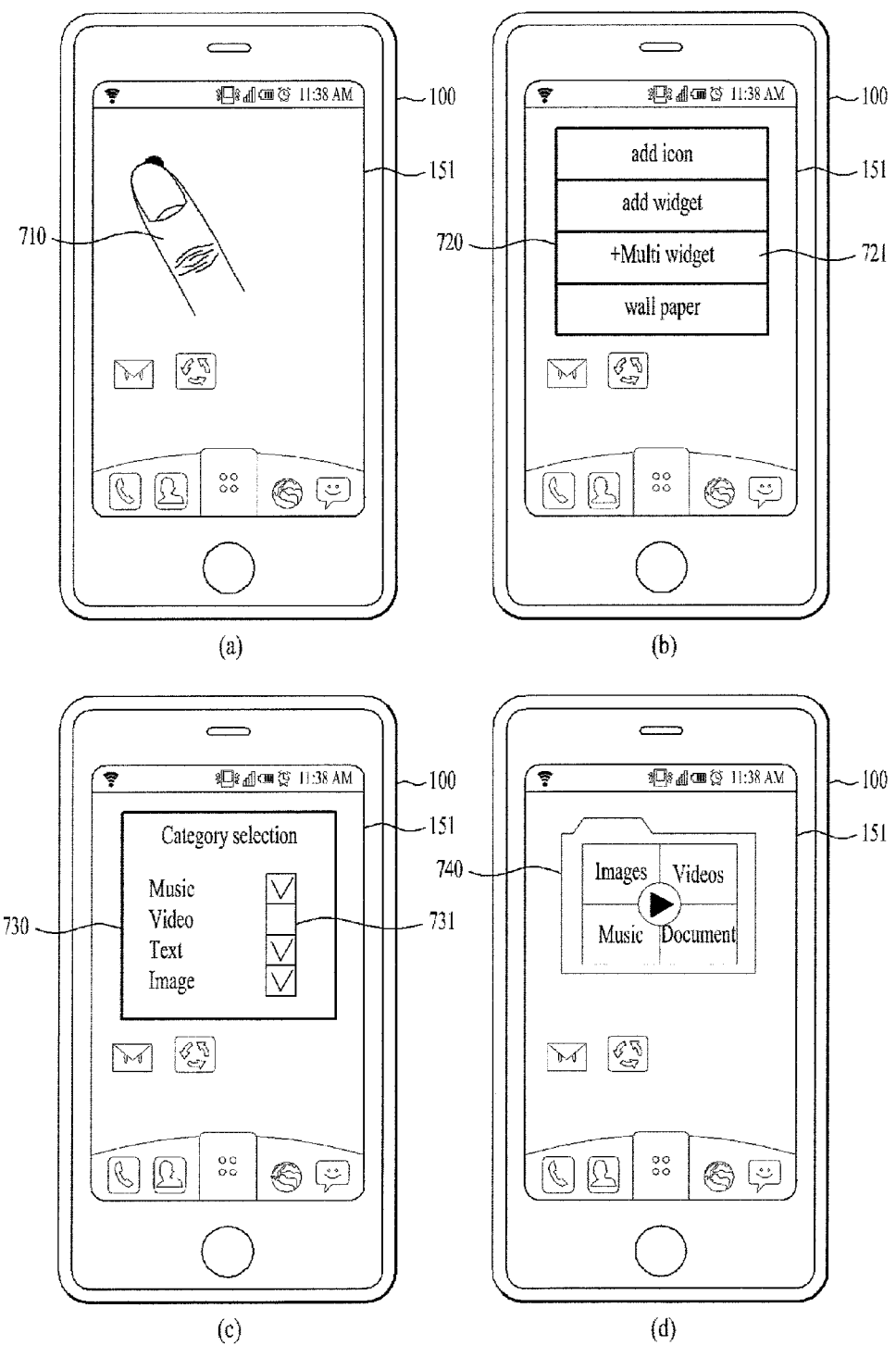
FIG. 7(a)-(d) is a diagram for one example of a method of creating a multi-widget on a home screen in a mobile terminal according to one embodiment of the present invention.

FIG. 7 is a diagram for one example of a method of creating a multi-widget on a home screen in a mobile terminal according to one embodiment of the present invention.

Referring to FIG. 7, a user can apply a long touch input to an empty space (e.g., a space having an icon or widget not arranged therein, etc.) on a home screen using a pointer 710 [FIG. 7(a)]. If so, a menu 720 for editing the home screen can be displayed [FIG. 7(b)]. In the home screen edit menu 720, an icon add menu, a widget add menu, a multi-widget add menu 721, a wallpaper select menu and the like can be included. If the multi-widget add menu 721 is selected, a menu 730 for selecting a category for configuring a multi-widget can be displayed [FIG. 7(c)]. It is able to select whether to apply each category using a checks box 731 (or a selecting means capable of performing a function similar to that of the check box). If music, text and image categories are selected [FIG. 7(c)], a multi-widget shown in FIG. 7(d) can be created on the home screen. Yet, in case of the creating method described with reference to FIG. 7, since categories are selected but a content belonging to each of the categories is not selected in the course of the creating process, it may be necessary to additionally perform a content selecting process. In particular, the controller 180 can automatically add the content selecting process in accordance with a frequency of user's access to a prescribed one of contents corresponding to each of the categories. Alternatively, once a region corresponding to each of the categories is selected, a list of contents belonging to the corresponding category is displayed. Subsequently, a user is then allowed to select a content, which is to be included in the corresponding category, from the displayed contents list.

In the following description, a method of playing a content using a multi-widget is explained with reference to FIG. 8 and FIG. 9.

Figure 9:
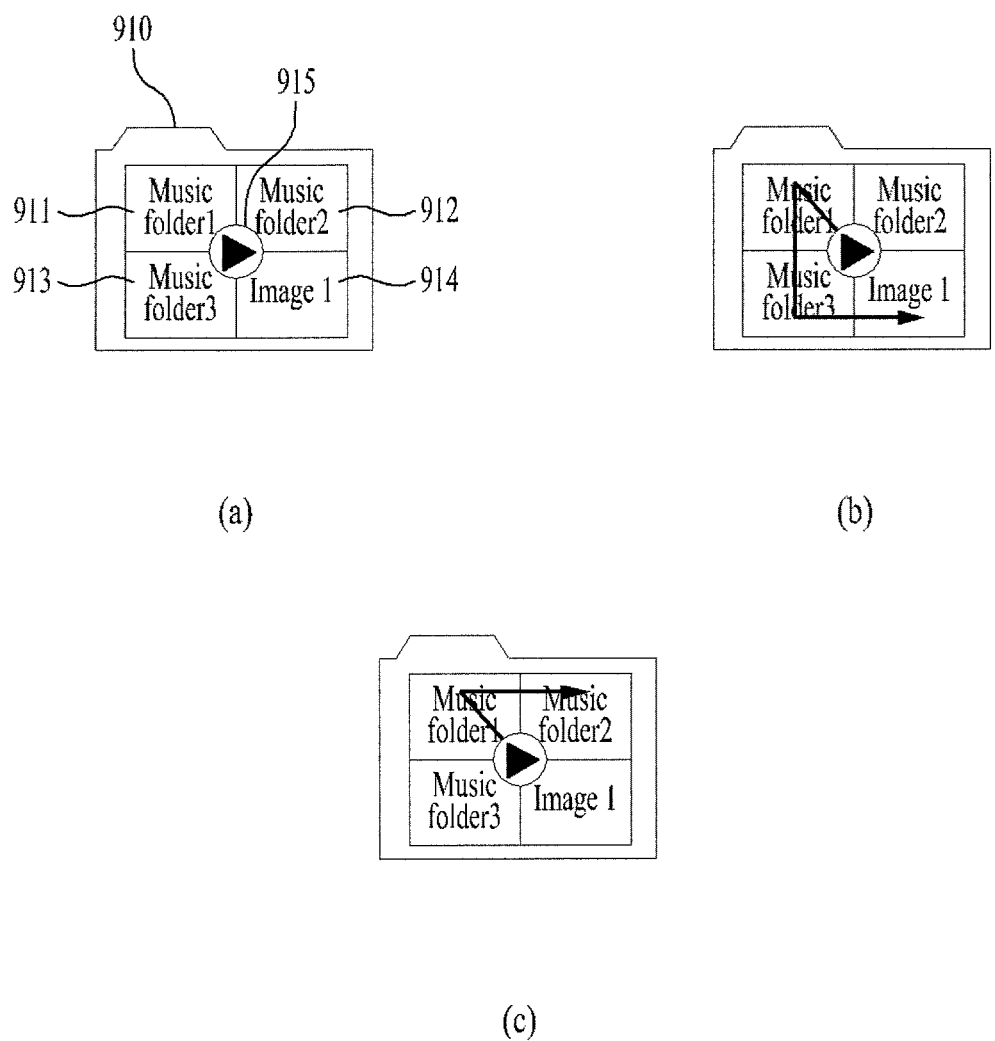

FIG. 8 and FIG. 9 are diagrams for methods of playing a content using a play menu button in a mobile terminal according to one embodiment of the present invention, respectively.

Referring to FIG. 8, assume a case that an inner space of a multi-widget is partitioned to configure 3 partitions. For instance, referring to FIG. 8(a), an inner space of a folder-shaped rim 810 of a multi-widget is partitioned into an image category region 811, a music category region 812 and a document category region 813. And, a play menu button 814 may be provided to the center of the inner space. If a user simply touches the play menu button 814, all contents configuring the multi-widget can be simultaneously played. For instance, referring to FIG. 8(b), an image 821 belonging to the image category is displayed on the touchscreen and a text 833 belonging to the document category can be displayed in a manner of overlaying the image 812. At the same time, a music belonging to the music category can be played via the audio output unit. In doing so, a menu for controlling a music play state may be arranged on a prescribed region 822 on the touchscreen. So to speak, if the play menu button 814 is selected, a user can read a text outputted over the image while listening to the music. In particular, in case that a plurality of contents belong to each of the categories, an image can be changed in a prescribed time interval and a text can be scrolled in the prescribed time interval. Moreover, a music can be changed into a next content each time a playback is ended by content unit. Alternatively, a single content may be repeatedly played or displayed. If the play menu button is not displayed on the multi-widget, as shown in FIG. 4 or FIG. 5, a user can collectively play the contents corresponding to the corresponding multi-widget by touching a prescribed point on the multi-widget.

The controller 180 may selectively play contents belonging to some of the categories corresponding to regions included in a drag path of the play menu button dragged by a user only. For instance, when the user intends to play a content belonging to a single category only, if the user drags the play menu button to a region corresponding to a play desired category and then releases a corresponding touch input, the controller 180 can play the content of the corresponding category only. For another instance, referring to FIG. 8 (c), if the play menu button is dragged to a region corresponding to the document category via a region corresponding to the music category and a corresponding touch input is then released, a text 833 belonging to the document is displayed and a music content belonging to the music category can be simultaneously played as well. For further instance, if a touch input to one of the inner regions of the multi-widget is detected, the controller 180 can selectively play a content corresponding to the touch input detected region only.

Meanwhile, it may be unnecessary for an inner space of a multi-widget to be partitioned with reference to different categories. For instance, referring to FIG. 9(a), a multi-widget 910 can include a plurality of music contents folders 911, 912 and 913, a single image content 914 and a play menu button 915. Moreover, each of the music contents folders 911 to 913 can include at least one or more music contents.

In doing so, referring to FIG. 9(b), if the play menu button is dragged to an image via two music contents folders and a corresponding touch input is then released, music contents belonging to the two folders included in a corresponding drag path can be played in prescribed order while an image content is displayed as a background image.

Referring to FIG. 9(c), if the play menu button is dragged through two music contents folders only and a corresponding touch input is then released, music contents belonging to the two folders included in a corresponding drag path can be played in prescribed order.

For example, the play sequence may be determined between folders in accordance with a before & after relation on a drag path on a play menu button. For another example, the play sequence may be determined between contents in a folder in accordance with alphabetic order of content names or order in being added to the corresponding folder. In particular, if contents in each inner region differ from each other in category, as shown in FIG. 8, contents on a drag path of a play menu button can be simultaneously played. If contents of each inner region belong to the same category, a play sequence may depend on a drag path of a play menu button.

In the following description, a method of sharing a content using a multi-widget is explained in detail with reference to FIG. 10.

Figure 10:
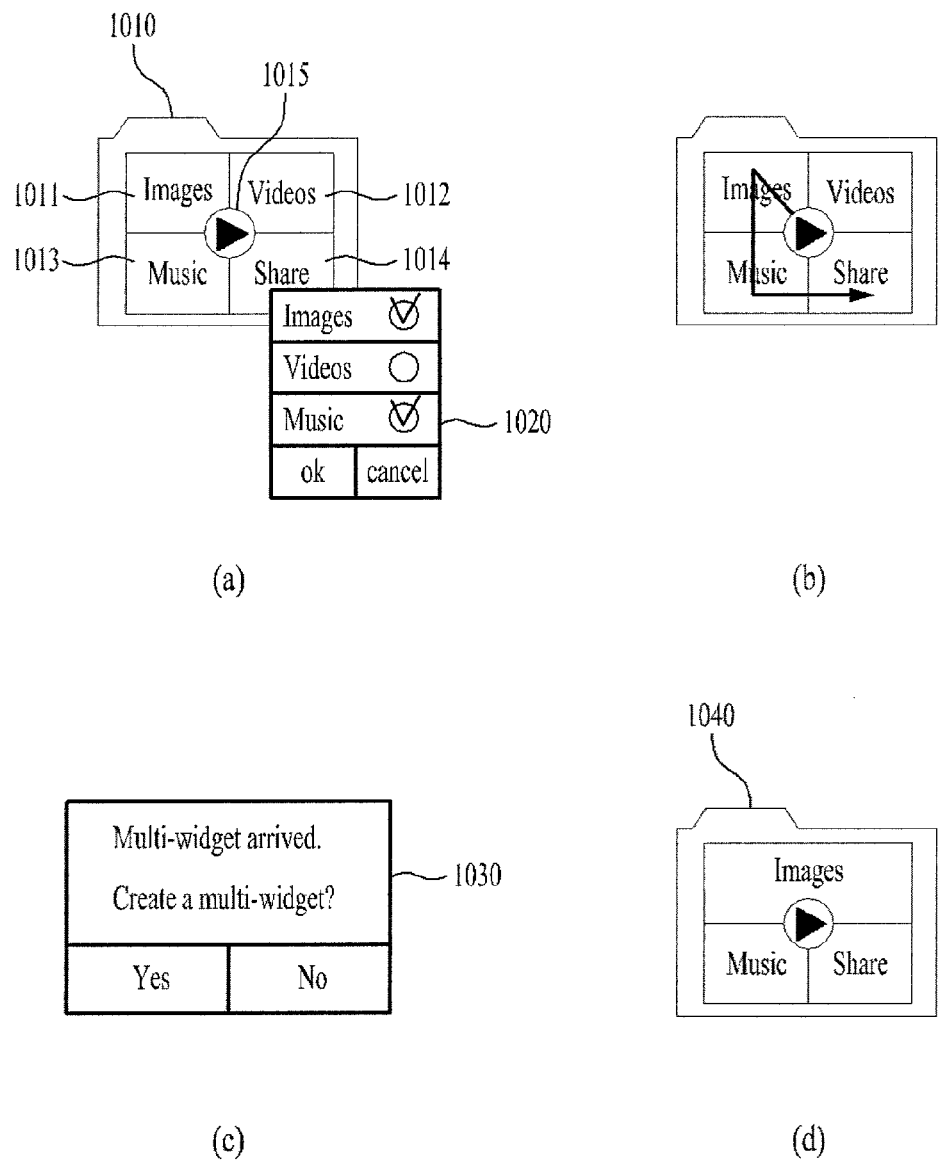
FIG. 10(a)-(d) is a diagram for one example of a method of sharing a content corresponding to a multi-widget in a mobile terminal according to one embodiment of the present invention.

FIG. 10 is a diagram for one example of a method of sharing a content corresponding to a multi-widget in a mobile terminal according to one embodiment of the present invention.

Referring to FIG. 10(a), a share menu 1014 can be arranged on one of partitioned regions within a multi-widget 1010. If the share menu 1014 is selected, a menu window 1020 for selecting a sharing target from the rest of the partitioned regions except the share menu 1014 in the multi-widget can be displayed.

Alternatively, referring to FIG. 10(b), if a play menu button 1015 is dragged and a corresponding touch input is released from the share menu 1014 in a manner similar to that of the content playing method mentioned in the foregoing description instead of using the menu window, contents corresponding to the portioned regions on the drag path can be selectively shared.

If the sharing target is determined by the method shown in FIG. 10(a) or FIG. 10(b), the controller 180 can output a user interface for receiving a selection of a sharing method (e.g., SNS application, email application, MMS, etc.) or a selection of a sharing counterpart from a user to the touchscreen. Since this user interface can be configured similar to that of a general content sharing process, its details shall be omitted from the following description.

If the sharing method and the sharing counterpart are specified, the controller 180 can transmit configuration information of a multi-widget to the specified sharing counterpart by the specified sharing method. In this case, the configuration information of the multi-widget may include an information on a shape (e.g., the number of partitioned regions, information displayed on each of the partitioned regions, etc.) of the multi-widget, a contents list included in the multi-widget, a content file itself and the like. Of course, regarding a content located at a web, a cloud or the like, address information of the corresponding content can be included in the configuration information instead of the file itself.

Referring to FIG. 10(c), having received the configuration information of the multi-widget, a terminal of a counterpart can display a popup window 1030 for confirming whether to create a multi-widget in accordance with the received configuration. In case that the image and the music content are determined to be shared, as shown in FIG. 10(a) or FIG. 10(b), the multi-widget of the shape shown in FIG. 10(d) can be created on the counterpart's terminal.

According to another aspect of the present embodiment, a multi-widget can be configured with application instead of contents. This is described in detail with reference to FIG. 11 as follows.

FIG. 11 is a diagram for one example of a case that a plurality of applications are combined with a multi-widget in a mobile terminal according to another aspect of one embodiment of the present invention.

Referring to FIG. 11, if a command of a prescribed type is inputted to a widget 1110 of a gallery application for playing an image file [FIG. 11(a)], the controller 180 can control a list 1120 of applications, which can be activated together with the gallery application, to be displayed [FIG. 11(b)].

If a specific contact is selected through a phonebook application 1125 and an instant messenger application 1127 is selected, the widget 1110 of the gallery application can be changed into a multi-widget 1110' in a manner that an inner space of the widget is divided into 3 partitioned regions 1111, 1112 and 1113 [FIG. 11(c)]. In particular, an image corresponding to a gallery application widget is displayed on the left region 1111, an image corresponding to the selected contact is displayed on the right top region 1112, and a text corresponding to the instant messenger is displayed on the right bottom region 1113, for example.

In doing so, if the multi-widget is selected, functions of the respective applications can be activated at a time in a manner of being combined with each other. For instance, referring to FIG. 11(d), an image, which is to be transmitted to the selected contact via the instant messenger, can be selected through the gallery application. Thus, a user can control a desired image to be transmitted to a counterpart, to whom image files are frequently transmitted, by making a single selection. For another example of application function combination, in case that the application is replaced by a camera application in the multi-widget shown in FIG. 11, when the corresponding multi-widget is selected, the camera application is activated in the first place and a taken image may be then directly transmitted to a selected contact through an instant messenger. In doing so, an activation sequence or combination form of the applications included in the multi-widget may follow the added order of the applications in creating the multi-widget or may be configured to enable the controller 180 to autonomously determine an executable form.

Multi-Widget for Single Content

Generally, on an icon for a single content, an image corresponding to a thumbnail or extension of the corresponding content is displayed only. And, a widget for enabling a playback of the corresponding content is configured in a manner that a play menu button is added to the image corresponding to the thumbnail or extension. However, the above-mentioned icon or widget is unable to provide various kinds of informations on the corresponding content. Therefore, another embodiment of the present invention proposes a following configuration. First of all, an inner space of a multi-widget is partitioned into a plurality of regions. Secondly, different informations on a single content are displayed on a plurality of the regions, respectively. Namely, a single multi-widget is created for a single content and various kinds of side informations on the corresponding content can be displayed on the inner space of the multi-widget. In other words, a single multi-widget is correspondingly created for an upper content and a lower content subordinate to the upper content is displayed on an inner space of the multi-widget. For instance, the upper content is a video content and the lower content may include a screenshot thumbnail image, ranking information, background music information, synopsis information and character (cast member) information of the corresponding video content and the like.

One example of a multi-widget corresponding to a video content is described with reference to FIG. 12 as follows.

Figure 12:
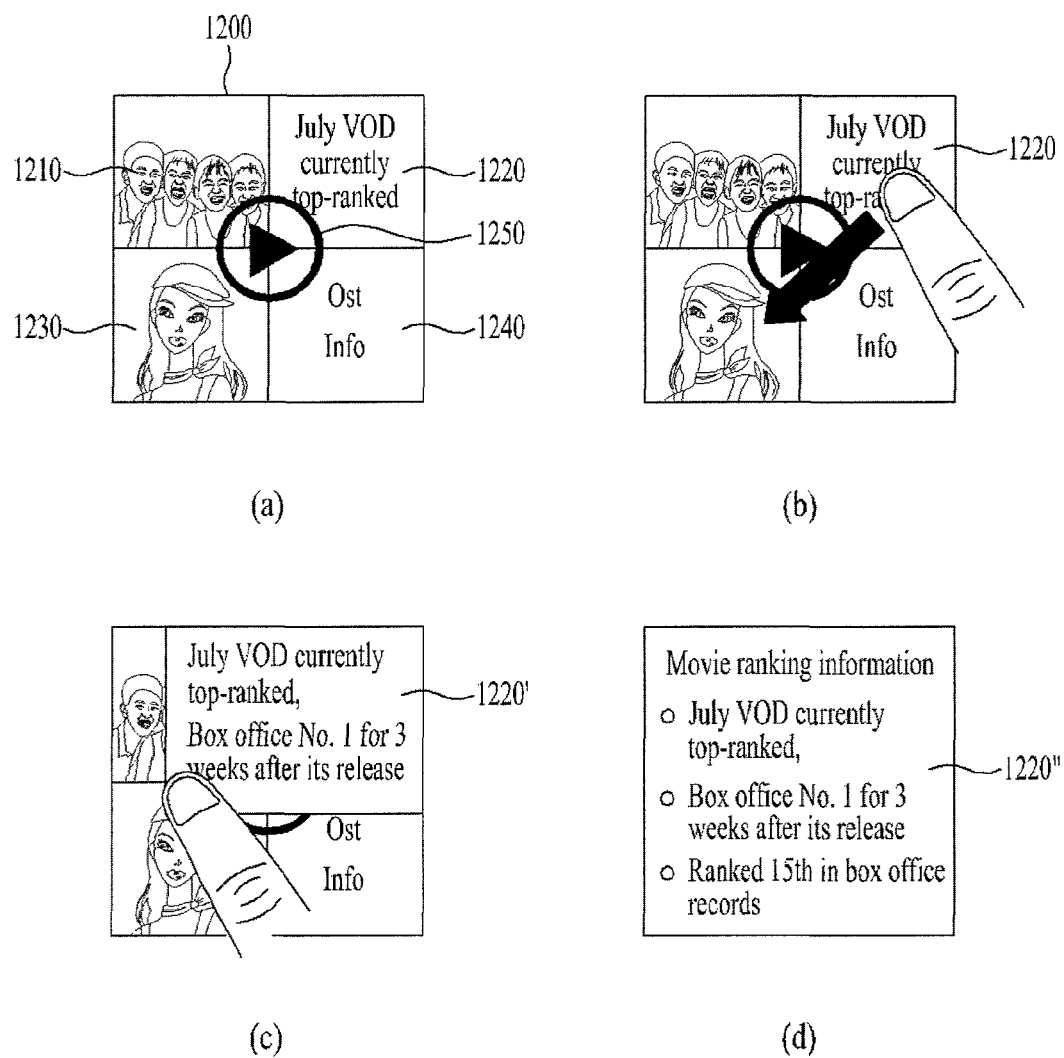
FIG. 12(a)-(d) is a diagram for one example of a multi-widget type corresponding to a video content in a mobile terminal according to another embodiment of the present invention.

FIG. 12 is a diagram for one example of a multi-widget type corresponding to a video content in a mobile terminal according to another embodiment of the present invention.

Referring to FIG. 12(a), an inner space of a multi-widget 1200 corresponding to a video content is divided into 4 partitioned regions 1210, 1220, 1230 and 1240 and different informations can be displayed on the 4 partitioned regions 1210, 1220, 1230 and 1240, respectively. In particular, a thumbnail image in a specific view of a video is displayed on the left top region 1210, a ranking information of the corresponding video is displayed on the right top region 1220, cast member information of the corresponding video is displayed on the left bottom region 1230, and an inserted audio information of the corresponding video is displayed on the right bottom region 1240, for example. Moreover, a play menu button 1250 may be displayed on the center of the multi-widget 1200. If the play menu button 1250 is selected by a touch input, a video player application for playing the corresponding video content can be activated.

Meanwhile, a size of each of the partitioned regions can be changed by a touch input and more information can be further displayed in accordance with the changed size. For instance, if the right top region 1220 for displaying the ranking information is dragged in a left bottom direction [FIG. 12(c)], the right top region 1220' can be extended in response to the drag distance [FIG. 12(c)]. Hence, more ranking informations can be further displayed.

If a user drags the right top region 1220 to a left bottom end of the multi-widget 1220, the corresponding region 1220" can be extended up to a whole size of the multi-widget [FIG. 12(d)]. In this case, ranking related informations more than those displayed in FIG. 12(c) can be displayed on the extended region 1220". In the state shown in FIG. 12(d), if the extended region 1220" is selected again by a touch input, a web browser application is activated so that a search result of the ranking related information can be displayed as a full screen through the web browser application. Of course, in the state shown in FIG. 12(a), if the right top region is simply touched, a search result of the ranking related information can be displayed as a full screen through the web browser application.

Besides, if the left top region 1210 is extended in a manner similar to those shown in FIG. 12(b) to FIG. 12(d), more thumbnails can be further displayed. If the left bottom region 1230 is extended, more cast member informations can be further displayed.

Meanwhile, information displayed on each of the partitioned regions may be obtained from a content itself or may be obtained through an internet search via the wireless communication unit. In doing so, a search word may include a combination of a title of the content and a type of information corresponding to the partitioned region. For instance, if a title of a video content is 'Movie-A' and a type of information is 'ranking information', the corresponding search word may include 'Movie-A ranking information'.

In the following description, a method of creating a multi-widget is explained in detail with reference to FIG. 13.

FIG. 13 is a diagram for one example of a method of creating a multi-widget from a video file in a mobile terminal according to another embodiment of the present invention.

Referring to FIG. 13, if a user applies a touch input (e.g., a long touch) of a prescribed pattern to an icon 1310 corresponding to a video file [FIG. 13(*a*)], a menu window 1320 including operations executable on the corresponding video file can be displayed [FIG. 13(*b*)]. If a multi-widget menu 1324 is selected from the menu window 1320, a popup window 1330 for selecting informations for configuring an inner space of the multi-widget menu 1324 through check boxes can be displayed [FIG. 13(*c*)]. If the check boxes are set as shown in FIG. 13(*c*), a multi-widget similar to that shown in FIG. 12(*a*) can be created. Besides, instead of having the multi-widget created by the user, the controller 180 can autonomously replace an icon, which corresponds to a file having a specific extension, by a multi-widget in accordance with a prescribed reference and is then able to display the corresponding multi-widget.

The multi-widget configured by the above-mentioned method can be displayed in a manner of replacing a previous icon corresponding to a video file or may be created at a preset location (e.g., home screen, etc.) separately from the previous icon. In case that a user intends to change a configuration of the created multi-widget, a method similar to the multi-widget editing method mentioned in the foregoing description with reference to FIG. 5 can be applied.

Meanwhile, in case that a video playback is stopped, a function for conveniently performing a continued view function can be provided through a multi-widget. In this case, the continued view function means a function of resuming a playback from a previously playback stopped point in case that a video is played again after the stop of the video playback. This is described in detail with reference to FIG. 14 as follows.

FIG. 14 is a diagram for one example of a method of creating a multi-widget through a video play application in a mobile terminal according to another embodiment of the present invention.

Referring to FIG. 14, when a video player application is active, a menu window 1410 for setting a function related to a continued view can be displayed through a prescribed menu manipulation [FIG. 14(*a*)]. In doing so, when 'multi-widget creation' menu is selected, if a play-stopped situation (e.g., termination of the video player application, an activation of another application, an occurrence of an event such as a call signal reception and the like, a power-off of a mobile terminal, etc.) occurs in the course of a video playback, the controller 180 can create a multi-widget 1420 for the play-stopped video at a preset location [FIG. 14(*b*)]. In this case, a thumbnail image in a play-stopped view and a play menu button 1421 can be arranged on the initially created multi-widget 1420. Thereafter, if another play-stopped situation occurs after resuming the playback of the corresponding video [FIG. 14(*c*)], an inner space of the multi-widget is divided into two parts including a left region and a right region, a previously displayed thumbnail and a play menu button 1421' are arranged on the left region, and a thumbnail image in a last play-stopped view and a play menu button 1422 are arranged on the right region. If a user selects the play menu button 1421' on the left side in the multi-widget 1420', the corresponding video can be played from the initially-stopped view. If the user selects the play menu button 1422 on the right side in the multi-widget 1420', the corresponding video can be played from the last-stopped view. Thus, if a play-stopped situation occurs again in the course of playing the corresponding video, an inner space of the multi-widget is partitioned multiple times as many as a count of the play-stopped situation, new thumbnail images and new play menu buttons can be further arranged. If the inner space of the multi-widget is partitioned multiple times as many as a preset maximum count, the controller 180 can replace a thumbnail image of an oldest region by a new image each time a new play-stopped situation occurs.

Of course, the embodiment shown in FIG. 12 and the embodiment shown in FIG. 14 can be combined together. For instance, if a multi-widget has 4 partitioned regions, a function of starting a play from a specific view can be arranged on two partitioned regions, as shown in FIG. 14, and informations on the corresponding video can be displayed on the rest of the portioned regions.

Meanwhile, a multi-widget can be configured to perform a bookmark function on a webpage instead on a video content. This is described in detail with reference to FIG. 15 as follows.

FIG. 15 is a diagram for one example of a method of creating a multi-widget corresponding to a webpage and accessing the webpage using the multi-widget according to another embodiment of the present invention.

Referring to FIG. 15(*a*), assume that a webpage 1510 including 4 images 1511, 1512, 1513 and 1514 is configured in a size greater than a size 151' amounting to a full screen size displayable on the touchscreen of the mobile terminal. In this case, the webpage corresponds to an upper content and each text or image can be regarded as a lower content configuring the upper content.

If a command for creating a bookmark of a multi-widget type is inputted in a prescribed form, the controller 180 can create a bookmark 1520 of a multi-widget type at a preset location (e.g., a bookmark list, a home screen, etc.) [FIG. 15(*b*)]. An inner space of the bookmark 1520 is divided into partitioned regions 1521, 1522, 1523 and 1524 as many as the number of images of the corresponding webpage. And, thumbnail images of images can be displayed on the partitioned regions 1521, 1522, 1523 and 1524, respectively.

In doing so, if a user selects the left bottom region 1523 of the bookmark 1520, a web browser is activated and the corresponding webpage can be then displayed in a manner that the image 1513 corresponding to the selected region is displayed at the center of the webpage. Through this, the user can directly access a desired part when revising the corresponding webpage.

In the above-described embodiments, menu configuration types, widget shapes, icon shapes, and information displayed or displayable on each partitioned region of a multi-widget are exemplarily provided, by which the present invention may be non-limited. And, it is apparent to those skilled in the art that the present invention is applicable to various configurations.

It will be apparent to those skilled in the art that various modifications and variations can be specified into other form(s) without departing from the spirit or scope of the inventions.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen; and
a controller configured to:
create a display object corresponding to an upper content in a manner of having an inner space partitioned into a plurality of regions,
display the display object on the touchscreen, wherein a plurality of lower contents subordinate to the upper content are displayed on the plurality of the regions, and at least a part of an edge of each of the plurality of lower contents are arranged facing each other respectively,
detect a first drag touch input to a first lower content of the plurality of lower contents displayed on the touch screen,
change a size of a partitioned region corresponding to the first lower content based on the first drag touch input,
display a second lower content on the changed partitioned region instead of the first lower content,
display a play menu icon within the inner space of the display object, and
in response to receiving a second drag touch input on the play menu icon and dragging the play menu icon in a drag path across at least two regions among the plurality of regions, simultaneously play at least two content items corresponding to the at least two regions within the drag path,
wherein the at least two content items are different types of media,
wherein the second lower content is different than the first lower content,
wherein the second lower content is not displayed in the plurality of lower contents and the second lower content is subordinate to the upper content, and
wherein a size of partitioned regions corresponding to the plurality of regions excluding the first lower content is maintained.

2. The mobile terminal of claim 1, wherein the controller is further configured to: detect an input to select the play menu icon, and play the upper content.

3. The mobile terminal of claim 1, wherein the upper content corresponds to a single video content and wherein the lower content includes side information on the lower content.

4. The mobile terminal of claim 3, wherein the side information comprises at least one selected from the group comprising a thumbnail image, ranking information, inserted audio information, synopsis information and cast member information of the video content.

5. The mobile terminal of claim 3, further comprising a wireless communication unit, and
wherein the controller is configured to obtain the side information by a search through the wireless communication unit.

6. The mobile terminal of claim 3, wherein the lower content further comprises a thumbnail image of a specific play view of the video content, and
wherein the controller is further configured to:
detect an input to select a region having the specific play view thumbnail image arranged thereon is selected from the plurality of the regions, and
play the video content from the specific play view.

7. The mobile terminal of claim 1, wherein the controller is further configured to:
detect an input to select a prescribed region from the plurality of the regions, and
display a lower content corresponding to the selected prescribed region as a full screen.

8. The mobile terminal of claim 1, wherein the upper content corresponds to a webpage and wherein the lower content includes an image included in the webpage.

9. The mobile terminal of claim 8, wherein the controller is further configured to:
detect an input to select a prescribed region from the plurality of the regions, and
display a part including an image corresponding to the selected region on the webpage.

10. The mobile terminal of claim 1, wherein the at least two content items include an image content and a media content that includes sound, and
wherein the controller is further configured to:
simultaneously display the image content as a background image on the touchscreen and output the sound of the media content based on the second drag touch input.

11. A method of controlling a mobile terminal, the method comprising:
displaying a display object corresponding to an upper content in a manner of having an inner space partitioned into a plurality of regions;
wherein a plurality of lower contents subordinate to the upper content are displayed on the plurality of the regions, and at least a part of an edge of each of the plurality of lower contents are arranged facing each other respectively;
detecting a first drag touch input to a first lower content of the plurality of lower contents displayed on the touch screen;
changing a size of a partitioned region corresponding to the first lower content based on the first drag touch input;

displaying a second lower content on the changed partitioned region instead of the first lower content;

displaying a play menu icon within the inner space of the display object; and in response to receiving a second drag touch input on the play menu icon and dragging the play menu icon in a drag path across at least two regions among the plurality of regions, simultaneously playing at least two content items corresponding to the at least two regions within the drag path, wherein the at least two content items are different types of media, wherein the second lower content is different than the first lower content, wherein the second lower content is not displayed in the plurality of lower contents and the second lower content is subordinate to the upper content, and wherein a size of partitioned regions corresponding to the plurality of regions excluding the first lower content is maintained.

12. The method of claim 11,
wherein the method further comprises: detecting an input to select the play menu icon, and playing the upper content.

13. The method of claim 11, wherein the upper content corresponds to a single video content and wherein the lower content includes side information on the lower content.

14. The method of claim 13, wherein the side information comprises at least one selected from the group comprising a thumbnail image, ranking information, inserted audio information, synopsis information and cast member information of the video content.

15. The method of claim 13, further comprising obtaining the side information by a search through a wireless communication unit.

16. The method of claim 13, wherein the lower content further comprises a thumbnail image of a specific play view of the video content, and
wherein the method further comprises:
detecting an input to select a region having the specific play view thumbnail image arranged thereon from the plurality of the regions; and
playing the video content from the specific play view.

17. The method of claim 11, further comprising:
detecting an input to select a prescribed region from the plurality of the regions; and
displaying a lower content corresponding to the selected prescribed region as a full screen.

18. The method of claim 11, wherein the upper content corresponds to a webpage and wherein the lower content includes an image included in the webpage.

19. The method of claim 18, further comprising:
detecting an input to select a prescribed region from the plurality of the regions; and
displaying a part including an image corresponding to the selected region on the webpage.

20. The method of claim 11, wherein the at least two content items include an image content and a media content that includes sound, and
wherein the method further comprises:
simultaneously displaying the image content as a background image on the touchscreen and outputting the sound of the media content based on the second drag touch input.

* * * * *